United States Patent
Azuma et al.

(10) Patent No.: US 8,474,864 B2
(45) Date of Patent: Jul. 2, 2013

(54) AIRBAG DEVICE

(75) Inventors: Hidetaka Azuma, Settsu (JP); Shuhei Konishi, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/147,497

(22) PCT Filed: Mar. 12, 2010

(86) PCT No.: PCT/JP2010/054170
§ 371 (c)(1),
(2), (4) Date: Aug. 2, 2011

(87) PCT Pub. No.: WO2010/122852
PCT Pub. Date: Oct. 28, 2010

(65) Prior Publication Data
US 2012/0001409 A1   Jan. 5, 2012

(30) Foreign Application Priority Data

Apr. 23, 2009 (JP) .................................. 2009-104708

(51) Int. Cl.
*B60R 21/213* (2011.01)
*B60R 21/232* (2011.01)
*B60R 21/233* (2006.01)

(52) U.S. Cl.
USPC ..................................... 280/730.2; 280/743.1

(58) Field of Classification Search
USPC .......................... 280/729, 730.2, 743.1, 743.2
See application file for complete search history.

(56) References Cited

U.S. PATENT DOCUMENTS

| | | | | |
|---|---|---|---|---|
| 6,199,898 | B1 * | 3/2001 | Masuda et al. | 280/730.2 |
| 6,530,595 | B2 * | 3/2003 | Masuda et al. | 280/730.2 |
| 6,755,436 | B2 * | 6/2004 | Hess et al. | 280/730.2 |
| 6,962,364 | B2 * | 11/2005 | Ju et al. | 280/730.2 |
| 2003/0218324 | A1 | 11/2003 | Ju et al. | |
| 2004/0104563 | A1 | 6/2004 | Fischer | |

FOREIGN PATENT DOCUMENTS

| | | |
|---|---|---|
| JP | 11 20588 | 1/1999 |
| JP | 2000-289559 | 10/2000 |
| JP | 2002 29359 | 1/2002 |
| JP | 2002-326552 | 11/2002 |
| JP | 2002 326552 | 11/2002 |
| JP | 2003 341456 | 12/2003 |

(Continued)

OTHER PUBLICATIONS

Machine Translation JP 2002-326552.*

(Continued)

*Primary Examiner* — Joseph Rocca
(74) *Attorney, Agent, or Firm* — Oblon, Spivak, McClelland, Maier & Neustadt, L.L.P.

(57) ABSTRACT

An inflator that supplies gas in the event of a vehicle emergency and a curtain airbag that is inflated and deployed by gas introduction from the inflator are included. The curtain airbag includes an airbag body obtained by sewing a pair of base cloths together. The airbag body has, in the portion in which the gas is introduced from the inflator, a sewn part obtained by sewing a pair of edges of the base cloths. The airbag body further includes a protective cloth sewn to each of the pair of edges along the sewn part such that the sewn part is covered from the inside of the airbag body.

12 Claims, 13 Drawing Sheets

FOREIGN PATENT DOCUMENTS

| | | |
|---|---|---|
| JP | 3757330 B2 | 1/2006 |
| JP | 3839252 B2 | 8/2006 |
| JP | 2007 8318 | 1/2007 |
| JP | 2007 331421 | 12/2007 |
| JP | 2009 83552 | 4/2009 |

OTHER PUBLICATIONS

Machine Translation JP 2007-008318.*

Machine Translation JP 2007-331421.*

International Preliminary Report on Patentability with Written Opinion issued on Dec. 1, 2011 in PCT/JP2010/054170 filed Mar. 12, 2010.

International Search Report issued May 18, 2010 in PCT/JP10/54170 filed Mar. 12, 2010.

Extended European Search Report issued Oct. 5, 2012, in Patent Application No. 10766911.1.

Combined Office Action and Search Report issued Dec. 21, 2012 in Chinese Patent Application No. 201080017738.9 with English language translation.

* cited by examiner

F I G. 2
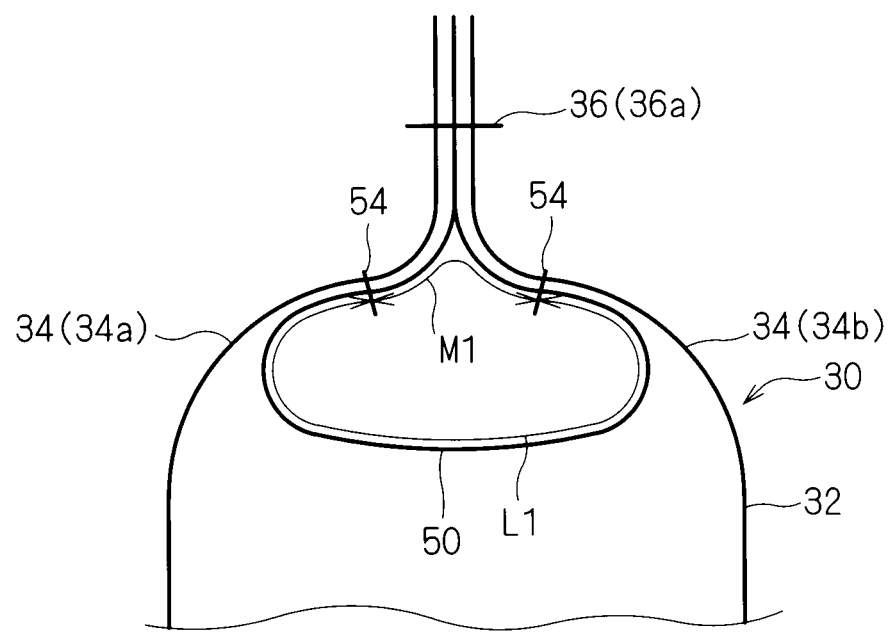

F I G. 7
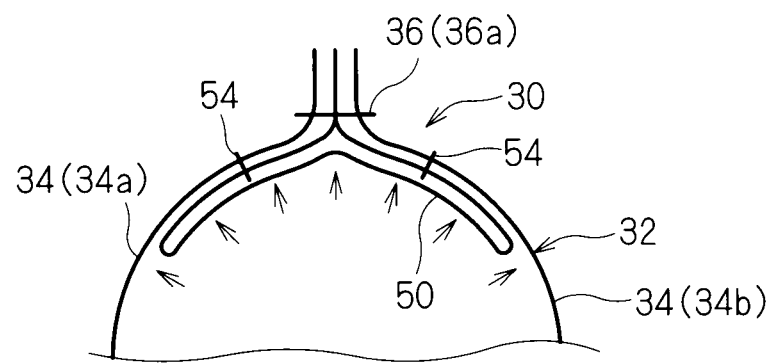

F I G . 1 2
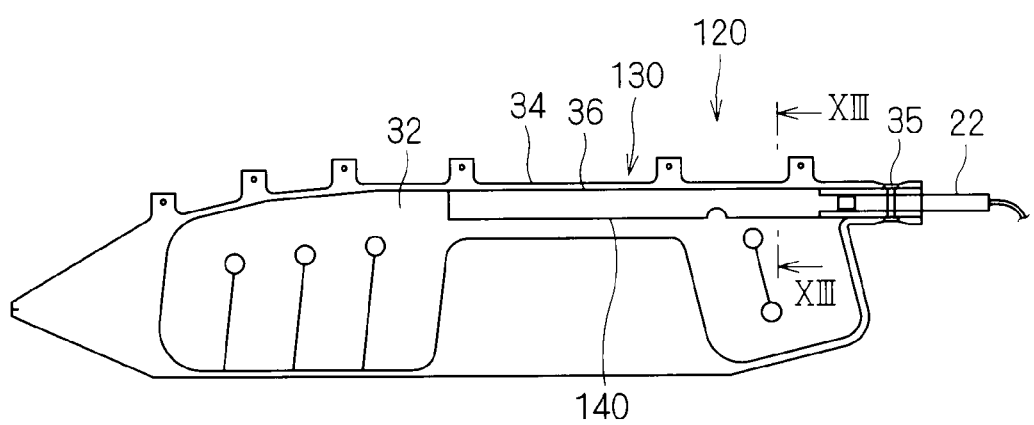

F I G . 1 4
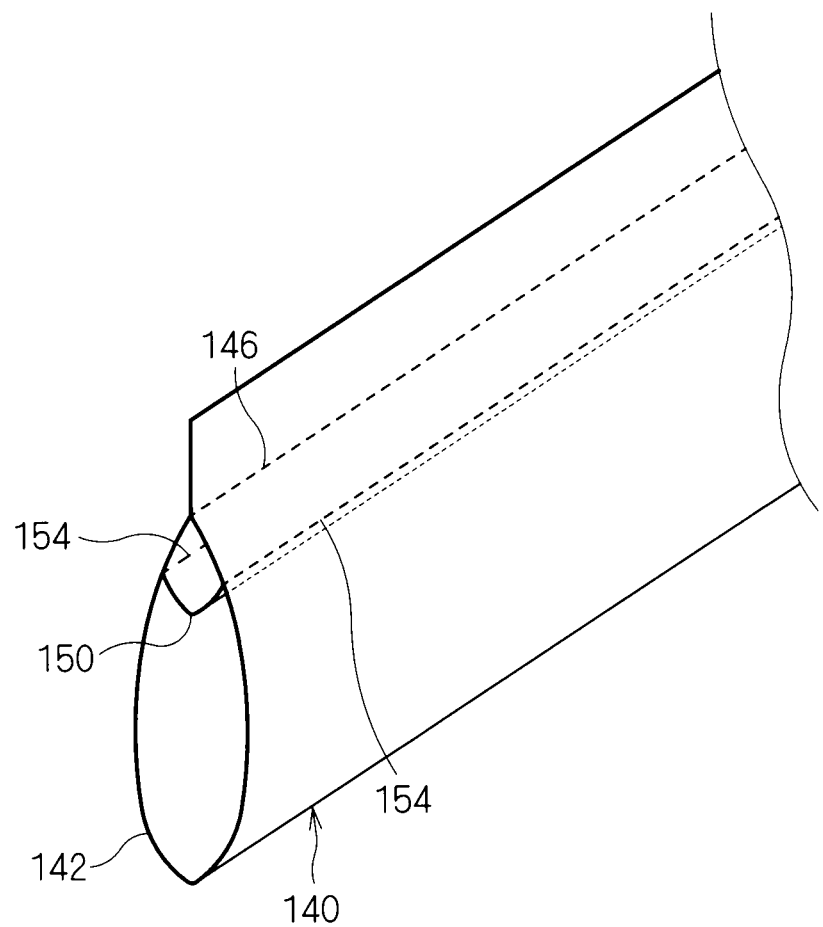

AIRBAG DEVICE

TECHNICAL FIELD

The present invention relates to the technology of protecting a sewn portion of an airbag that is inflated by the gas from an inflator operating in the event of a vehicle emergency.

BACKGROUND ART

A typical airbag device includes an inflator that injects high temperature and high pressure gas and an airbag formed into a bag shape by sewing the outer peripheries of a plurality of basic cloths with sewing thread. In the event of a vehicle emergency, high temperature and high pressure gas is introduced into the airbag from the inflator, and accordingly the airbag is inflated and deployed.

When the high temperature and high pressure gas is introduced into the airbag from the inflator, the high temperature gas from the inflator may directly act on the sewn part in the vicinity of the gas discharge part of the inflator.

As the technology of protecting the sewn part of the airbag, Patent Document 1 discloses the technology below.

In Patent Document 1, a pair of base cloths are sewn with a third base cloth being sandwiched therebetween. The third base cloth is provided so as to project toward the inside of the sewn part.

PRIOR ART DOCUMENT

Patent Document

Patent Document 1: Japanese Patent Application Laid-Open No. 2000-289559

SUMMARY OF THE INVENTION

Problem to be Solved by the Invention

Unfortunately, in the technology disclosed in Patent Document 1, the third base cloth is merely sandwiched between a pair of base cloths, and thus the sewn part of the pair of base cloths cannot be covered sufficiently when gas is introduced from the inflator. For example, in a case where the third base cloth leans to one side of a pair of base cloths in the airbag when gas is introduced, a sewing thread for sewing a pair of base cloths is exposed to the inside of the airbag between the third base cloth and the other base cloth, and accordingly the sewn part is exposed to high temperature gas.

The present invention therefore has an object of preventing a sewn part of an airbag from being directly exposed to high temperature gas from an inflator.

Means to Solve the Problem

An airbag device according to a first aspect includes: an inflator supplying gas in the event of a vehicle emergency; and an airbag inflated and deployed by the gas introduction from the inflator, wherein the airbag includes a sewn part obtained by sewing a pair of opposed portions of at least one base cloth in a portion into which the gas from the inflator is introduced, and further includes a protective cloth sewn to each of the pair of opposed portions in positions apart from the sewn part along the sewn part so as to cover the sewn part from an inner side into which the gas from the inflator is introduced.

According to a second aspect, in the airbag device according to the first aspect, the airbag includes an airbag body inflated and deployed into a bag shape upon a first base cloth and a second base cloth being sewn, and the gas from the inflator is introduced directly into the airbag body; and the protective cloth is provided to at least part of the sewn part of the first base cloth and the second base cloth.

According to a third aspect, in the airbag device according to the first aspect, the airbag includes an airbag body inflated and deployed into a bag shape, and an inner tube located in the airbag body and distributing the gas from the inflator into a plurality of spots in the airbag body; the inner tube is formed by rolling a belt-like third base cloth into a tubular shape and sewing both edges thereof with inner side surfaces thereof being opposed to each other; and the protective cloth is provided to at least part of the sewn part on the both edges of the inner tube.

According to a fourth aspect, in the airbag device according to the third aspect, an opening formed by the protective cloth or an opening formed the protective cloth and the third base cloth on the inflator side is closed.

According to a fifth aspect, in the airbag device according to any one of the first to fourth aspects, a width between a pair of protective cloth sewn parts in which the protective cloth is sewn to each of the pair of opposed portions relative to the protective cloth is larger than a width between the pair of protective cloth sewn parts relative to the base cloths.

According to a sixth aspect, in the airbag device according to any one of the first to fourth aspects, a width between a pair of protective cloth sewn parts in which the protective cloth is sewn to each of the pair of opposed portions relative to the protective cloth is smaller than a width between the pair of protective cloth sewn parts relative to the base cloths, and at least one of the pair of protective cloth sewn parts is formed so as to be broken by a tension acting by the gas introduction.

According to a seventh aspect, in the airbag device according to any one of the first to sixth aspects, the protective cloth is sewn to the pair of opposed portions such that edges thereof are directed to the sewn part and that an intermediate part in a width direction thereof is directed to an interior space side into which the gas from the inflator is introduced.

According to an eighth aspect, in the airbag device according to any one of the first to seventh aspects, the protective cloth is sewn in a state in which edges of the base cloths and edges of the protective cloth are aligned with each other.

Effects of the Invention

According to the airbag device of the first aspect, the airbag includes a sewn part in a portion into which the gas from the inflator is introduced, and the sewn part is covered with the protective cloth sewn to each of the pair of opposed portions in positions apart from the sewn part along the sewn part. This prevents the sewn part from being directly exposed to the high temperature gas from the inflator.

According to the airbag device of the second aspect, the sewn part of the airbag body can be prevented from being directly exposed to the high temperature gas from the inflator.

According to the airbag device of the third aspect, the sewn part of the airbag body in the inner tube can be prevented from being directly exposed to the high temperature gas from the inflator.

According to the airbag device of the fourth aspect, the inflator is inserted into the inner tube, where the opening formed by the protective cloth or the opening formed by the protective cloth and the third base cloth on the inflator side is closed. This prevents incorrect assembly.

According to the airbag device of the fifth aspect, the width between a pair of protective cloth sewn parts is larger on the protective cloth side than the base cloth side, and accordingly the tension by gas introduction mainly acts on the sewn part protected by the protective cloth. This distributes the spot on which the high temperature gas acts and the spot on which the tension by gas introduction acts, which increases the strength.

According to the airbag device of the sixth aspect, the tension by gas introduction acts on the protective cloth, and when the protective cloth sewn parts are broken, then acts on the sewn part. Accordingly, the tension by gas introduction acts on the protective cloth, protective cloth sewn parts, sewn part and the like in a distributed manner over time, which increases the strength. In addition, the protective cloth sewn parts are distributed in the middle, which prevents the base cloths from being damaged.

According to the airbag device of the seventh aspect, the protective cloth is sewn to the opposed portions such that the edges thereof are directed to the sewn part and that the intermediate part in the width direction thereof is directed to the inner side into which the gas from the inflator is introduced, and thus the protective cloth sewn parts are covered with the intermediate part in the width direction of the protective cloth when gas is introduced. This protects the protective cloth sewn parts with more reliability.

According to the airbag device of the eighth aspect, the protective cloth is sewn in the state in which the edges of the base cloths and the edges of the protective cloth are aligned with each other, which easily improves the positional accuracy in attaching the protective cloth to the airbag.

BRIEF DESCRIPTION OF DRAWINGS

FIG. 2 is a schematic cross-sectional view taken along the line II-II of FIG. 1.

FIG. 7 is an explanatory view showing the operation of the protective cloth.

FIG. 12 is a schematic view showing an overall configuration of a curtain airbag device according to a second embodiment.

FIG. 14 is a schematic perspective view showing the inner tube.

EMBODIMENTS FOR CARRYING OUT THE INVENTION

First Embodiment

Figure 1:
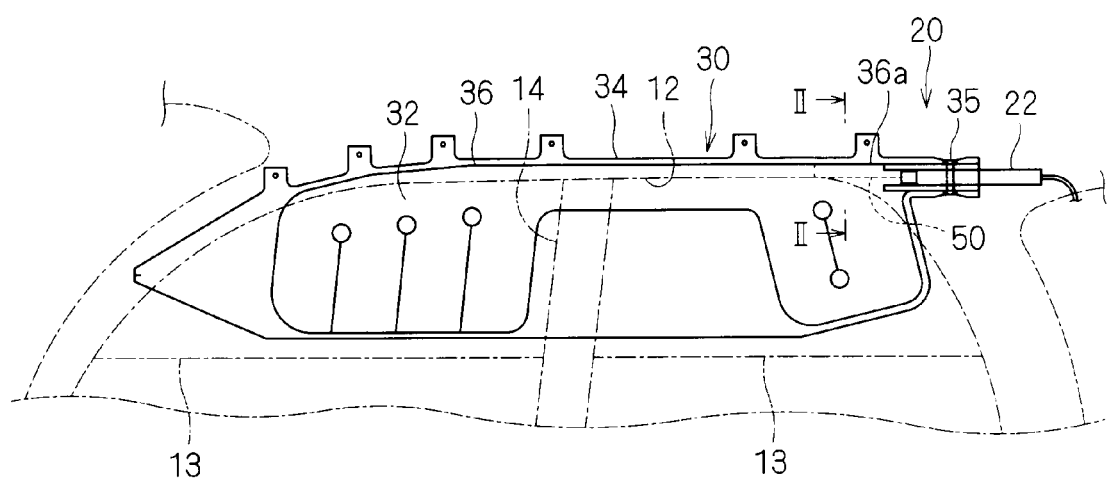
FIG. 1 is a schematic view showing an overall configuration of a curtain airbag device according to a first embodiment.

A curtain airbag device according to a first embodiment is described. FIG. 1 is a schematic view showing the overall configuration of a curtain airbag device 20, and FIG. 2 is a schematic cross-sectional view taken along the line II-II of FIG. 1.

The curtain airbag device 20 is provided in a side portion inside a vehicle cabin and is configured so as to be deployed in the event of a vehicle emergency, which includes an inflator 22 and a curtain airbag 30.

The inflator 22 is formed into a rod shape, and is configured to supply high temperature and high pressure gas into the curtain airbag 30 in response to a detection signal in a vehicle collision.

The curtain airbag 30 is normally housed by being folded along a roof side rail 12 positioned above side windows 16. The curtain airbag 30 is folded in the shape of, for example, a roll or bellows. In the event of a vehicle emergency such as a side collision of a vehicle, the gas supplied from the inflator 22 is introduced into the curtain airbag 30, with the result that the curtain airbag 30 is inflated and deployed into a flat bag shape between the side windows 13 of the vehicle and the head of a passenger of the vehicle.

More specifically, the curtain airbag 30 includes an airbag body 32 that can be inflated and deployed into a bag shape. In this case, the airbag body 32 includes a pair of elongated belt-like base cloths 34 extending along the front and rear side windows 13 of a vehicle. The outer peripheries of the pair of base cloths 34 are sewn together with sewing thread or the like as a pair of opposing portions to form a sewn part 36, whereby the airbag body 32 is configured so as to be inflated and deployed into a flat bag shape between the side windows 13 of the vehicle and the head of a passenger of the vehicle.

Each base cloth 34 may be formed by a plurality of layered cloths. Alternatively, a pair of base cloths 34 may be, for example, sewn together at an appropriate spot other than the peripheries thereof. Note that in some cases, one and the other of the pair of base cloths 34 are referred to as a first base cloth 34a and a second base cloth 34b as required for distinction or the like.

Further, formed in one side part of one end of the airbag body 32 (in this case, upper portion of the airbag body 32, which is the rear side portion in the state where the airbag body 32 is attached to the vehicle) is an inflator introducing part 35 that has an opening passing through the airbag body 32 internally and externally. Further, one end of the inflator 22 on the side on which gas is supplied is inserted into the inflator introducing part 35. In the present embodiment, one end of the inflator 22 is disposed in the airbag body 32 such that the gas supplied from the one end of the inflator 22 is introduced into the airbag 32.

A protective cloth 50 is provided so as to cover part of a sewn part 36a of the sewn part 36 of the airbag body 32, into which the gas from the inflator 22 is introduced.

The protective cloth 50 is a belt-like cloth and has a length dimension large enough to cover the sewn part 36a. Both side edges of the protective cloth 50 are respectively sewn to the pair of base cloths 34 with sewing thread along protective cloth sewn parts 54 at positions apart from the sewn part 36a toward the inside of the airbag body 32, that is, at the positions that sandwich the sewn part 36a. Note that the protective cloth 50 may be one obtained by layering a plurality of cloths.

In the state in which the protective cloth 50 is sewn to the pair of base cloths 34, the edges on both sides in the width direction of the protective cloth 50 are directed to the sewn part 36a of the pair of base cloths 34, while the intermediate part in the width direction of the protective cloth 50 is directed to the interior space side into which the gas from the inflator 22 is introduced (that is, interior space side of the curtain airbag 30). Accordingly, the protective cloth 50 covers protective cloth sewn parts 54 at which the protective cloth 50 is sewn to the pair of base cloths 34, as described below.

Further, the edges on the both sides in the width direction of the protective cloth 50 are aligned with respect to the external edges of the pair of base cloths of the sewn part 36a. This allows the positions at which the protective cloth 50 is sewn to the pair of base cloths 34 to be accurately determined as described below.

In addition, a length dimension L1 between the pair of protective cloth sewn parts 54 relative to the protective cloth 50 (that is, length dimension of the protective cloth 50 between the pair of protective cloth sewn parts 54) is set to be larger than a length dimension M1 between the pair of protective cloth sewn parts 54 relative to the base cloths 34 (that is, the sum of the length dimension between the protective cloth sewn part 54 of the base cloth 34a and the sewn part 36a and the length dimension between the protective cloth sewn part 54 of the base cloth 34b and the sewn part 36a). This allows the protective cloth 50 to cover the protective cloth sewn parts 54 with more reliability when the airbag body 32 is inflated and deployed, as described below.

The protective cloth 50 is sewn to a pair of base cloths 34 in, for example, the following manner.

Figure 3:
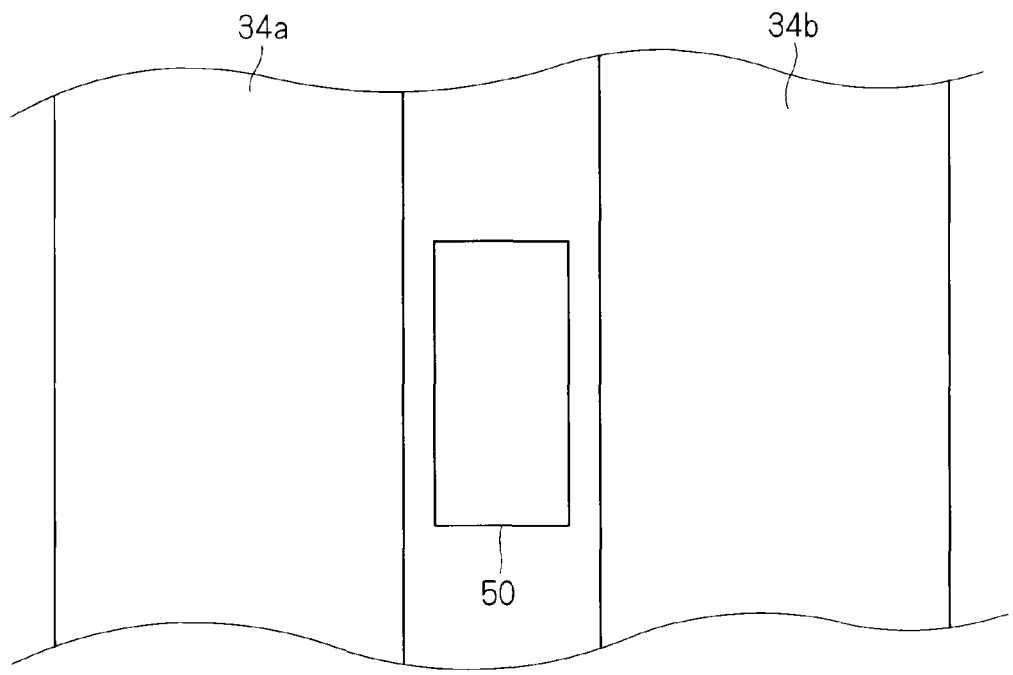
FIG. 3 is an explanatory view showing the procedure of sewing a protective cloth to an airbag body.

First, as shown in FIG. 3, a pair of base cloths 34a and 34b and the protective cloth 50 are prepared.

Figure 4:
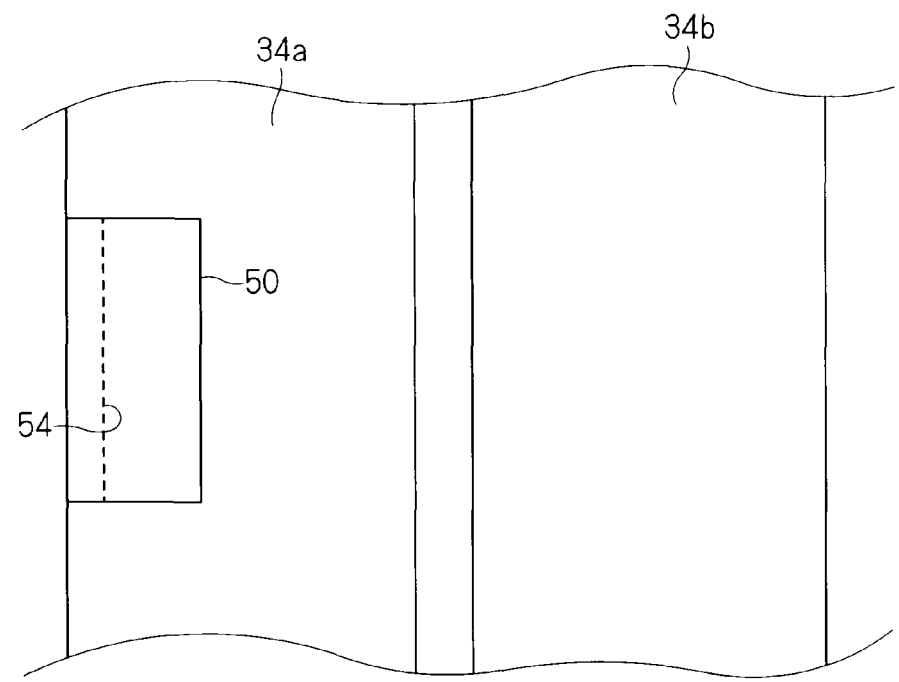
FIG. 4 is another explanatory view showing the procedure of sewing the protective cloth to the airbag body.

Next, as shown in FIG. 4, the protective cloth 50 is disposed on the base cloth 34a in an overlapping manner. Then, the edge on one side of the first base cloth 34a and the side edge of the protective cloth 50 are sewn together with sewing thread to form the protective cloth sewn part 54 on one side while aligning the edge on one side of the first base cloth 34a and the side edge on one side of the protective cloth 50.

Figure 5:
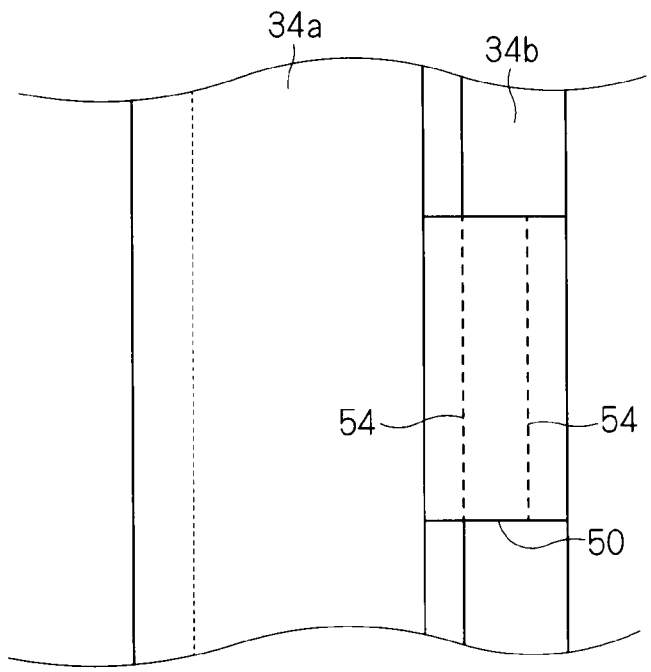
FIG. 5 is still another explanatory view showing the procedure of sewing the protective cloth to the airbag body.

Then, as shown in FIG. 5, the protective cloth 50 is disposed on the second base cloth 34b in an overlapping manner. Then, the edge on one side of the second base cloth 34b and the side edge of the protective cloth 50 are sewn together with sewing thread to form the protective cloth sewn part 54 on the other side while aligning the edge on one side of the second base cloth 34b and the side edge on the other side of the protective cloth 50.

Figure 6:
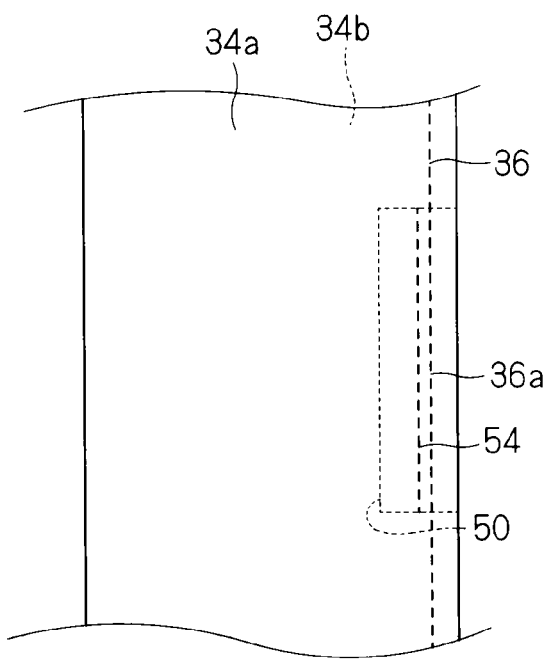
FIG. 6 is yet still another explanatory view showing the procedure of sewing the protective cloth to the airbag body.

After that, as shown in FIG. 6, the inner surfaces of the pair of base cloths 34a and 34b are opposed to each other, and the protective cloth 50 is disposed therebetween to be folded in two at the intermediate part in the width direction. Then, the edges of the pair of base cloths 34a and 34b are aligned, and the portions between the protective cloth sewn parts 54 on one side and the other side and the end of the edge are sewn, to thereby form the sewn part 36 including the sewn part 36a. As a result, the airbag body 32 is formed. Note that the sewn part 36a is formed by collectively sewing the pair of base cloths 34a and the protective cloth 50.

As described above, the respective protective cloth sewn parts 54 are formed with the edges of the pair of base cloths 34a and 34b and the side edge on one side of the protective cloth 50 being aligned, whereby it is possible to easily and accurately position the protective cloth 50 with respect to the airbag body 32. This also prevents the generation of defectives.

The operation of the curtain airbag device 20 to be inflated and deployed is described.

First, as described above, the curtain airbag 30 is housed and fastened along the roof side rail 12 in the state of being folded into an elongated shape in the initial state before being inflated and deployed.

In this state, the airbag body 32 forming the curtain airbag 30 is inflated and deployed upon gas being introduced from the inflator 22. On this occasion, the protective cloth 50 is attached so as to cover the sewn part 36a in the portion into which the gas from the inflator 22 is introduced. Accordingly, as shown in FIG. 7, when the airbag body 32 is inflated to some extent, the protective cloth 50 is pressed against the inner surface of the airbag body 32 so as to adhere thereto in such a manner of covering the sewn part 36a by a gas pressure from the inflator 22. That is, the gas from the inflator 22 is directly ejected to the protective cloth 50 and received by the protective cloth 50.

On this occasion, the edges on both sides in the width direction of the protective cloth 50 are directed to the sewn part 36a of the pair of base cloths 34, and the intermediate part in the width direction of the protective cloth 50 is directed to the interior space side into which the gas from the inflator 22 is introduced, whereby the portion of the protective cloth sewn part 54, which is exposed to the inside of the airbag body 32 with respect to the protective cloth 50, is covered with the protective cloth 50.

Further, the length dimension L1 between the pair of protective cloth sewn parts 54 on the protective cloth 50 side is larger than the length dimension M1 between the pair of protective cloth sewn parts 54 on the base cloth 34 side, and accordingly the tension by the airbag body 32 being about to be inflated mainly acts on the sewn part 36 between the pair of base cloths 34. Moreover, the both side edges of the protective cloth 50 for an extra amount larger than the length dimension M1 are pressed against the inside of the airbag body 32 so as to adhere thereto in such a manner of covering the protective cloth sewn parts 54 by a gas pressure. This causes the protective cloth sewn parts 54 to be covered with the protective cloth 50 as well.

According to the curtain airbag device 20 configured as described above, the curtain airbag 30 includes the sewn part 36a in the portion in which the gas from the inflator 22 is introduced, and the inner surface side of the sewn part 36a is covered with the protective cloth 50. This prevents the sewn part 36a from being directly exposed to the high temperature gas from the inflator 22 and prevents the sewn part 36a from being thermally affected. Therefore, it is possible to inflate the airbag body 32 with more reliability by gas introduction from the inflator 22.

In particular, the protective cloth 50 is sewn to a pair of base cloths 34 at positions at which the sewn part 36a is sandwiched therebetween, which achieves an advantage that the protective cloth 50 can cover the sewn part 36a with more reliability without consideration of the direction in which gas flows, the manner of folding the airbag body 32 or the like.

Further, the length dimension L1 between the pair of protective cloth sewn parts 54 on the protective cloth 50 side is larger than the length dimension M1 between the pair of protective cloth sewn parts 54 on the base close 34 side, whereby the tension when the airbag body 32 is about to be inflated by gas introduction acts mainly on the sewn part 36a protected by the protective cloth 50. Therefore, the protective cloth 50 is located at the spot to be exposed to the high temperature gas, and the sewn part 36a is located at the spot on which the tension acts, whereby the acted spots are dispersed to increase the strength. As a result, it is not required to excessively increase the strengths of the base cloths 34, sewn part 36, protective cloth 50 and protective cloth sewn parts 54, which lowers a cost.

Further, the protective cloth 50 is attached in the state in which the edges on both sides in the width direction of the protective cloth 50 are directed to the sewn part 36a of the pair of base cloths 34 and the intermediate part in the width direction of the protective cloth 50 is directed to the interior space side into which the gas from the inflator 22 is introduced. Accordingly, the portion of the protective cloth sewn part 54, which is exposed to the inside of the airbag body 32 with respect to the protective cloth 50, is covered with the protective cloth 50. This also prevents the protective cloth sewn part 54 from being directly exposed to high temperature and high pressure gas, whereby it is possible to effectively prevent the protective cloth sewn part 54 from being damaged.

Moreover, the both side edges of the protective cloth 50 for an extra amount larger than the length dimension M1 are pressed against the inside of the airbag body 32 so as to adhere thereto in such a manner of covering the protective cloth sewn parts 54 by a gas pressure. Accordingly, the entirety of the protective cloth sewn part 54 (in particular, the portion of the sewing thread between the protective cloth 50 and the base cloth 34, which forms the protective cloth sewn part 54) is also covered with the protective cloth 50. This prevents the protective cloth sewn part 54 from being damaged more effectively.

Modifications of the curtain airbag device 20 according to the first embodiment are described.

Figure 8:
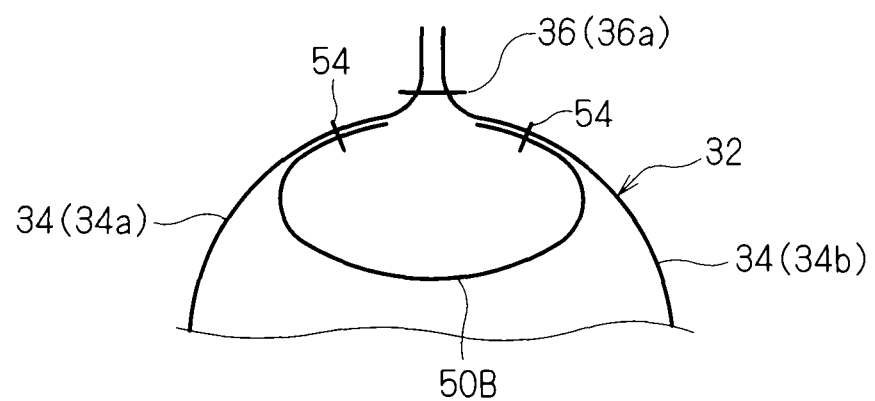
FIG. 8 is an explanatory view showing a modification of the first embodiment.

In the modification shown in FIG. 8, the edges on both sides in the width direction of a protective cloth 50B equivalent to the protective cloth 50 are not aligned with the edges of the base cloths 34 but are disposed inside the sewn part 36a. That is, the edges of the protective cloth are not necessarily required to be disposed to be aligned with the edges of the base cloths 34.

Figure 9:
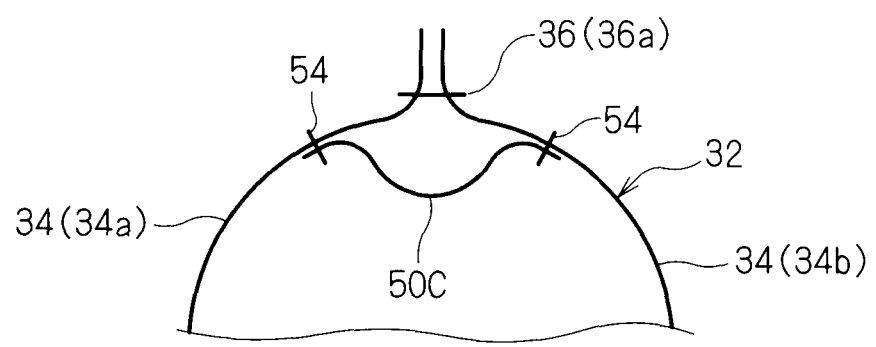
FIG. 9 is an explanatory view showing another modification of the first embodiment.

In the modification shown in FIG. 9, a protective cloth 50C equivalent to the protective cloth 50 is attached to the airbag body 32 in the state in which the intermediate part in the width direction of the protective cloth 50C is opposed to the sewn part 36a and the edges on both sides in the width direction of the protective cloth 50C are directed to the side opposite to the sewn part 36a. Also in this case, the protective cloth 50C can cover and protect the sewn part 36a, which prevents the sewn part 36a from being directly exposed to the high temperature and high pressure gas.

Figure 10:
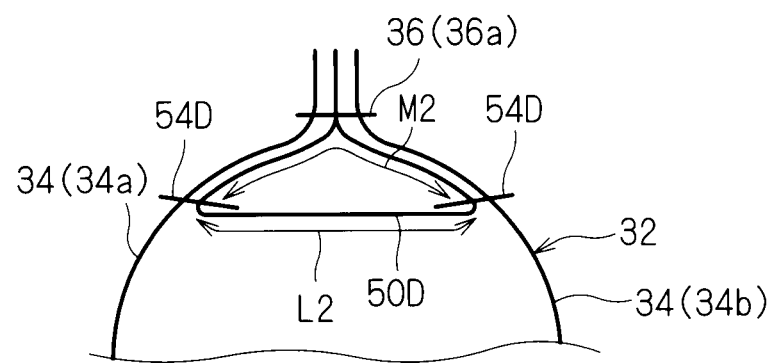
FIG. 10 is an explanatory view showing still another modification of the first embodiment.

In the modification shown in FIG. 10, in a protective cloth 50D and protective cloth sewn parts 54D equivalent to the protective cloth 50 and the protective cloth sewn parts 54, a length dimension L2 between the pair of protective cloth sewn parts 54D relative to the protective cloth 50D (that is, the length dimension of the protective cloth 50D between the pair of protective cloth sewn parts 54D) is set to be smaller than a length dimension M2 between the pair of protective cloth sewn parts 54D relative to the base cloths 34 (that is, the sum of the length dimension of the base cloth 34a between the protective cloth sewn part 54D and the sewn part 36a and the length dimension of the base cloth 34b between the protective cloth sewn part 54D and the sewn part 36a). In addition, the protective cloth sewn parts 54D are formed so as to be broken by the tension acting on the airbag body 32 when the airbag body 32 is caused to be inflated by the gas introduced by the inflator 22. The breaking strength (strength for causing break by the tension) of the protective cloth sewn part 54 can be set and adjusted by, for example, the strength of the sewing thread that forms the protective cloth sewn part 54 or the manner of sewing.

Figure 11:
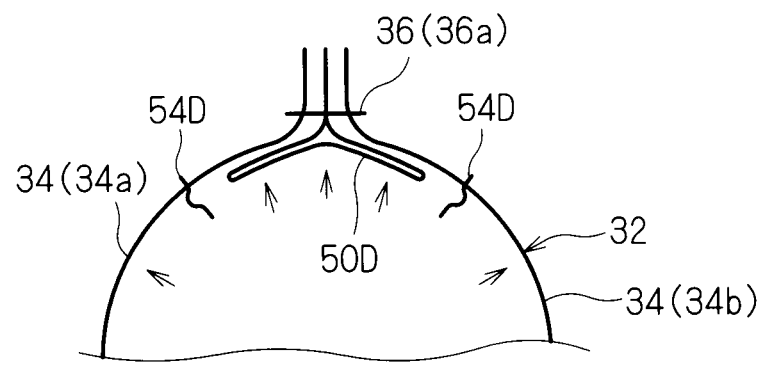
FIG. 11 is an explanatory view showing the operation of the still another modification.

According to this modification, at the initial stage at which the airbag body 32 is inflated and deployed after the gas is introduced from the inflator 22, the tension for pulling the base cloths 34 by gas introduction mainly acts on the protective cloth 50D and the protective cloth sewn parts 54D. Then, when the airbag body 32 continues to be inflated and deployed, and accordingly the tension becomes large to some extent, as shown in FIG. 11, for example, the sewing threads are broken, whereby the protective cloth sewn parts 54D are broken. After that, the tension acts on the sewn part 36 including the sewn part 36a. As described above, the tension for pulling the base cloths 34 by gas introduction acts on the protective cloth 50D and the protective cloth sewn parts 54D at the initial stage of inflation and deployment, then acts also on the protective cloth sewn parts 54D, and then acts on the respective portions in a distributed manner over time, which increases the strength. In other words, the impact by gas introduction is allowed to act on the sewn part 36a in the state in which the impact is once received and cushioned by the protective cloth 50 and the protective cloth sewn parts 54D. Further, the protective cloth sewn part 54D is broken in the middle, which prevents the base cloth 34 itself from being damaged.

Second Embodiment

Figure 13:
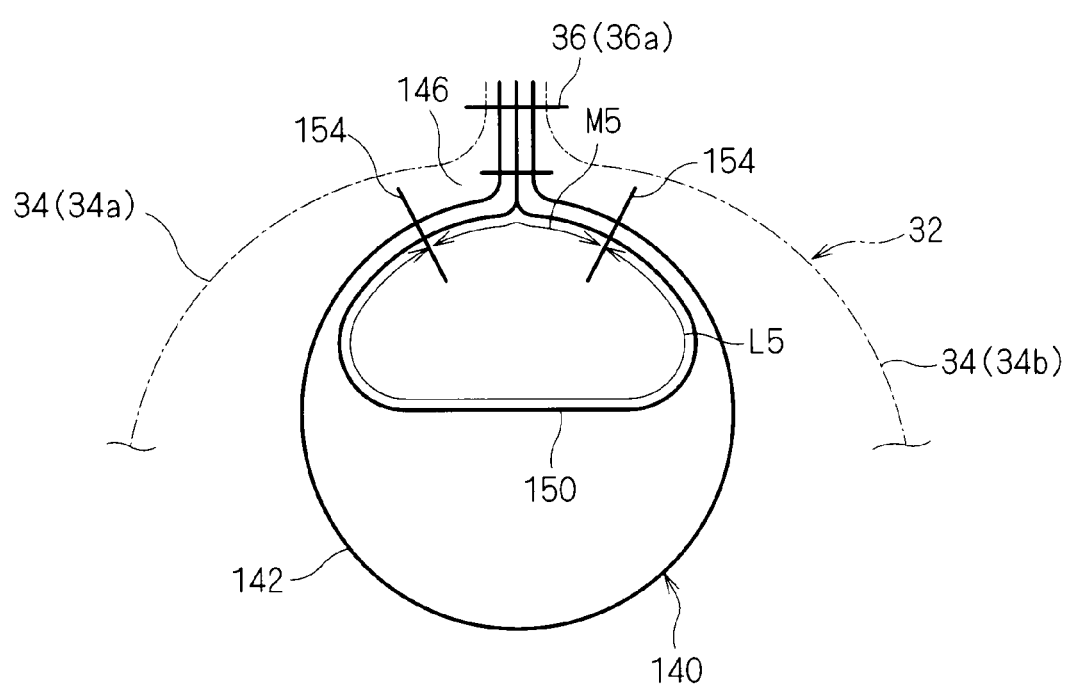
FIG. 13 is a schematic cross-sectional view showing an inner tube, which is taken along the line XIII-XIII of FIG. 12.

A curtain airbag device according to a second embodiment is described. FIG. 12 is a schematic view showing the overall configuration of a curtain airbag device 120, FIG. 13 is a schematic cross-sectional view showing an inner tube 140, which is taken along the line XIII-XIII of FIG. 12, and FIG. 14 is a schematic perspective view showing the inner tube 140.

The curtain airbag device 120 includes the inflator 22 and a curtain airbag 130. The curtain airbag 130 includes the airbag body 32 and the inner tube 140. The inflator 22 and the airbag body 32 themselves have similar configurations as those described in the first embodiment, and thus their description is omitted here.

The inner tube 140 is provided in the airbag body 32 and is configured to distribute the gas from the inflator 22 into a plurality of spots in the airbag body.

More specifically, the inner tube 140 is formed by rolling a belt-like third base cloth 142 into a tubular shape and sewing the both side edges thereof together with the inner surfaces thereof being opposed to each other, and is formed substantially into a tubular shape with both ends thereof being open and the intermediate part in the longitudinal direction thereof being open toward one side. The inner tube 140 is attached in the airbag body 32 in the state in which one end thereof is disposed in the inflator introducing part 35 of the airbag body 32 and the other end thereof is disposed in the intermediate part in the longitudinal direction within the airbag body 32. One end of the inflator 22 disposed in the inflator introducing part 35 of the airbag body 32 is also inserted into one end of the inner tube 140. The gas supplied from the inflator 22 passes through the inner tube 140 and is introduced into the airbag body 32 through the opening in the intermediate part in the longitudinal direction thereof and the opening at the other end. Note that the third base cloth 142 may be obtained by layering a plurality of cloths.

A protective cloth 150 is sewn to the inner tube 140 so as to cover a sewn part 146 at which both side edges of the inner tube 140 are sewn.

The protective cloth 150 is a belt-like cloth having a smaller width than that of the third base cloth 142 and has an approximately equal length dimension to that of the third base cloth 142. The both side edges of the protective cloth 150 are respectively sewn to the both side edges of the third base cloth 142, which are a pair of opposed portions, with sewing thread along the sewn part 146 at the positions apart from the sewn part 146 so as to cover the sewn part 146. Note that the protective cloth 150 also may be obtained by layering a plurality of cloths.

The manner of sewing the protective cloth 150 to the both side edges of the third base cloth 142 is similar to the manner of sewing the protective cloth 50 to the pair of base cloths 34 in the first embodiment.

That is, the edges on both sides in the width direction of the protective cloth 150 are directed to the sewn part 146 of the third base cloth 142, and the intermediate part in the width direction of the protective cloth 150 is directed to the interior space side into which the gas from the inflator 22 is introduced (that is, interior space side of the inner tube 140).

Further, the edges on both sides in the width direction of the protective cloth 150 are aligned with respect to the edges on both sides of the third base cloth 142.

In addition, a length dimension L5 between a pair of protective cloth sewn parts 154 at which the protective cloth 150 is sewn to the third base cloth 142 relative to the protective cloth 150 (that is, length dimension of the protective cloth 150 between the pair of protective cloth sewn parts 154) is set to be larger than a length dimension M5 between the pair of protective cloth sewn parts 154 relative to the third base cloth 142 (that is, the sum of the length dimension between the protective cloth sewn part 154 on one side of the third base cloth 142 and the sewn part 146 and the length dimension between the protective cloth sewn part 154 on the other side thereof and the sewn part 146).

For example, the protective cloth 150 is sewn to the third base cloth 142 as described below.

Figure 15:
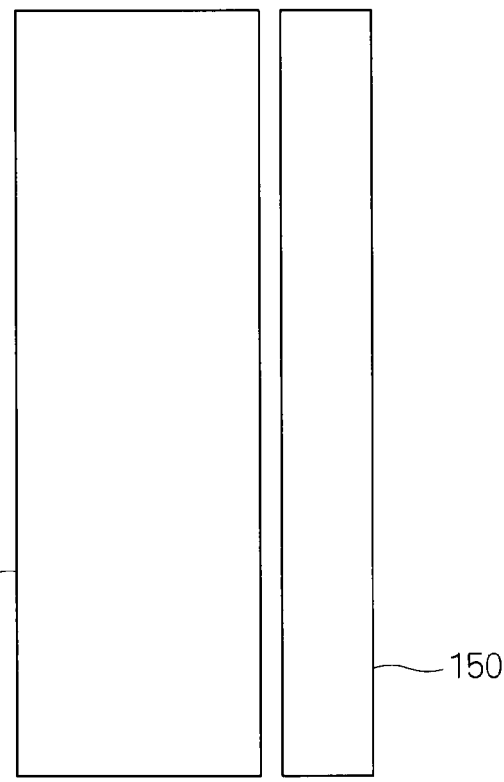
FIG. 15 is an explanatory view showing the procedure of sewing the protective cloth to the inner tube.

First, as shown in FIG. 15, the third base cloth 142 and the protective cloth 150 are prepared.

Figure 16:
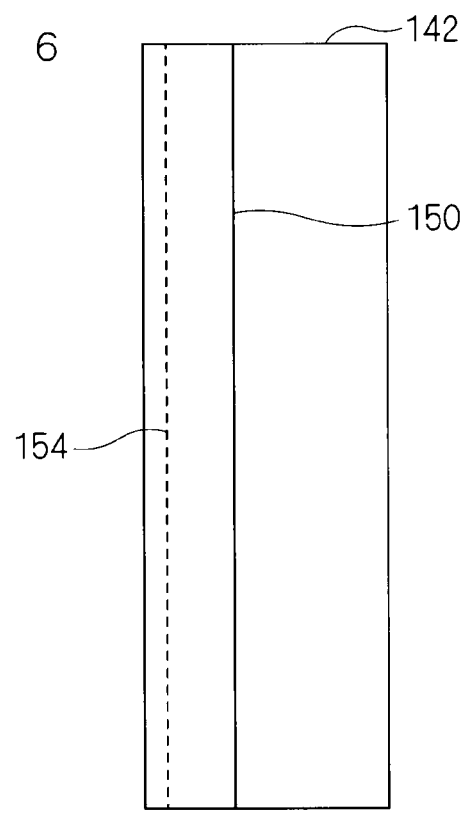
FIG. 16 is another explanatory view showing the procedure of sewing the protective cloth to the inner tube.

Then, as shown in FIG. 16, the protective cloth 150 is disposed on the third base cloth in an overlapping manner while aligning the side edge on one side of the third base cloth 142 and the side edge on one side of the protective cloth 150. Then, the side edge on one side of the third base cloth 142 and the side edge on one side of the protective cloth 150 are sewn together with sewing thread to form the protective cloth sewn part 154 on one side.

Figure 17:
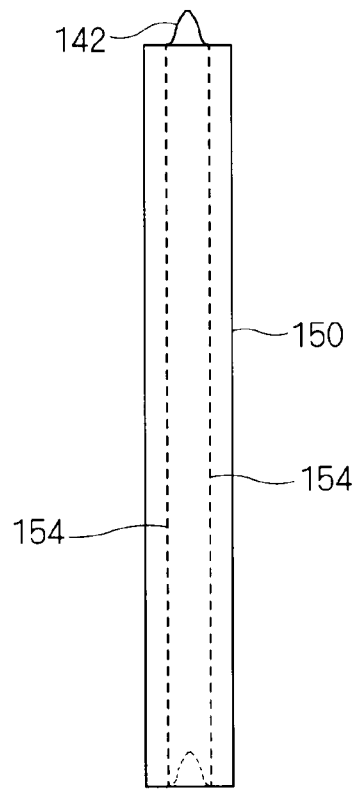
FIG. 17 is still another explanatory view showing the procedure of sewing the protective cloth to the inner tube.

Then, as shown in FIG. 17, the side edge on the other side of the third base cloth 142 and the side edge on the other side of the protective cloth 150 are aligned such that the third base cloth 142 is folded in two, which are sewn together with sewing thread to form the protective cloth sewn part 154 on the other side.

Figure 18:
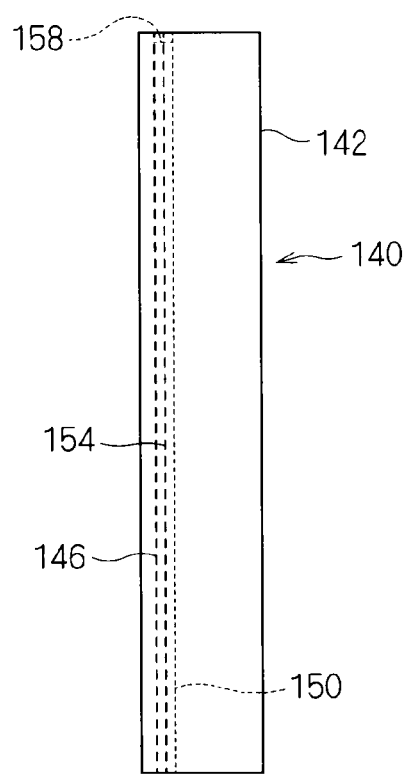
FIG. 18 is yet still another explanatory view showing the procedure of sewing the protective cloth to the inner tube.

After that, as shown in FIG. 18, the both side edges of the third base cloth 142 which has been folded in two are aligned while folding the protective cloth 150 inwardly.

After that, the both side edges of the third base cloth 142 are aligned, and the portions between the protective cloth sewn parts 154 on one side and the other side and the ends of the both side edges are sewn to form the sewn part 146, whereby the inner tube 140 is completed. Note that the sewn part 146 is formed by collectively sewing the third base cloth 142 and the protective cloth 150. The sewn part 146 may be shared by the sewn part 36 when the curtain airbag body 32 is formed.

As described above, the respective protective cloth sewn parts 154 are formed with the side edge of the third base cloth 142 and the side edge of the protective cloth 150 being aligned, with the result that the protective cloth 150 can be positioned with respect to the inner tube 140 easily and accurately.

The inner tube 140 manufactured as described above is attached to the airbag body 32 in the state of, for example, being sewn to the airbag body 32 in such a manner of being partially or entirely sewn to the side edge of the third base cloth 142.

Note that the space approximately in a tubular shape is formed by the protective cloth 150 in the above-mentioned inner tube 140. It is preferable in this case that the opening formed only by the third base cloth 142 (that is, the opening as the inner tube 140) be kept open and that the opening on the inflator 22 side of the openings on both sides formed by the protective cloth 150 be closed by, for example, being sewn in a separate manner. For example, as shown in FIG. 18, it suffices that the protective cloth 150 is sewn to form a closed sewn part 158 before the both side edges of the third base cloth 142 are sewn. This prevents the inflator 22 from being inadvertently inserted into the protective cloth 150. Note that the closed sewn part 158 is not required to entirely close the opening and may partially close the opening to such an extent that the inflator 22 cannot be inserted thereinto.

Note that in the case where a protective cloth 150B and the third base cloth 142 form an opening as in the example shown in FIG. 19 described below, it suffices that the opening on one side that is formed by the protective cloth 150B and the third base cloth 142 is entirely or partially closed.

According to the curtain airbag device 120 configured in this manner, the gas from the inflator 22 passes through the inner tube 140 to be introduced into the airbag body 32 when the curtain airbag 30 is about to be inflated and deployed by gas introduction from the inflator 22.

The protective cloth 150 is attached so as to cover the sewn part 146, whereby similar operation and effect to those of the first embodiment can be achieved when the gas from the inflator 22 passes through the inner tube 140.

That is, the gas from the inflator 22 is directly ejected to the protective cloth 150 and received by the protective cloth 150, which prevents the sewn part 146 from being directly exposed to the high temperature gas from the inflator 22 and prevents the sewn part 146 from being thermally affected. This allows the gas from the inflator 22 to be distributed by the inner tube 140 with more reliability to inflate the airbag body 32 with more reliability. On this occasion, the protective cloth 150 adheres to the inner peripheral surface of the inner tube 140, and accordingly the flow of the gas in the inner tube 140 is unlikely to be hampered.

Further, the length dimension L5 between the pair of protective cloth sewn parts 154 on the protective cloth 150 side is larger than the length dimension M5 between the pair of protective cloth sewn parts 154 on the third base cloth 142 side. Accordingly, as in the above, the protective cloth 150 is located at the spot to be exposed to the high temperature gas, and the sewn part 146 is located at the spot on which the tension acts, whereby the acted spots can be dispersed. This makes the inner tube 140 excellent in strength.

Further, the protective cloth 150 is attached in the state in which the edges on both sides in the width direction of the protective cloth 150 are directed to the sewn part 146 and the intermediate part in the width direction of the protective cloth 150 is directed to the interior space side into which the gas from the inflator 22 is introduced. This prevents the protective cloth sewn parts 154 from being directly exposed to the high temperature and high pressure gas and effectively prevents the protective cloth sewn parts 154 from being damaged.

Further, the both side edges of the protective cloth 150 for an extra amount are pressed against the inner tube 140 so as to adhere thereto in such a manner of covering the protective cloth sewn parts 154 by a gas pressure. Accordingly, the entirety of the protective cloth sewn parts 154 is also covered with the protective cloth 150. This prevents the protective cloth sewn parts 154 from being damaged more effectively.

Also in the present embodiment, various modifications are conceivable as in the modifications of the first embodiment.

Figure 19:
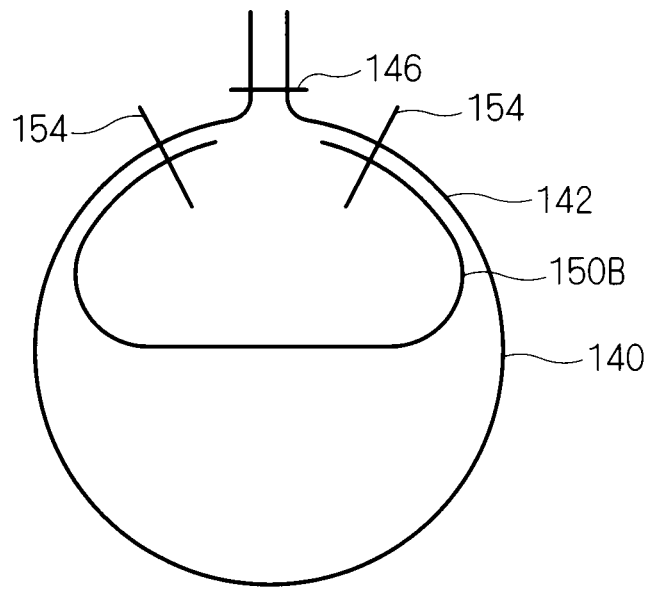
FIG. 19 is an explanatory view showing a modification of the second embodiment.

For example, as shown in FIG. 19, the edges on both sides in the width direction of the protective cloth 150B equivalent to the protective cloth 150 are not necessarily required to be disposed so as to be aligned with the edges on both sides of the third base cloth 142 (as to the first embodiment, see the modification shown in FIG. 8).

Figure 20:
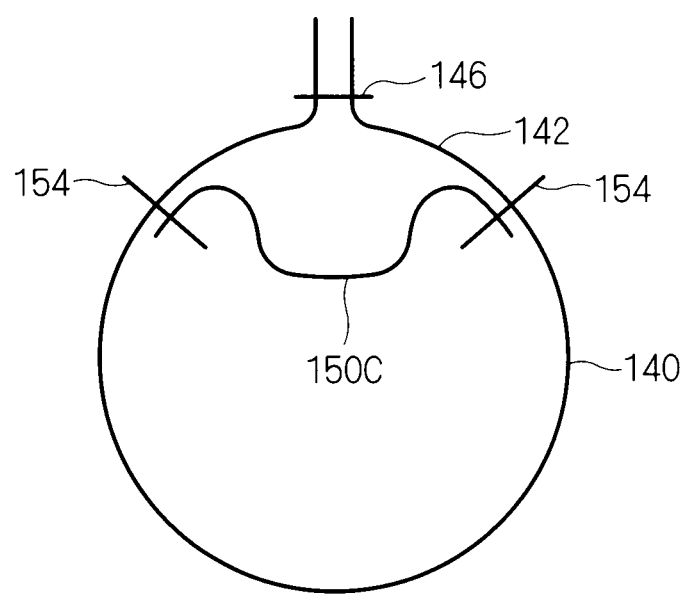
FIG. 20 is an explanatory view showing another modification of the second embodiment.

Alternatively, as show in FIG. 20, a protective cloth 150C equivalent to the protective cloth 150 may be attached to the inner tube 140 in the state in which, for example, the intermediate part in the width direction of the protective cloth 150C is directed to the sewn part 146 and the edges on both sides in the width direction of the protective cloth 150C are directed to the side opposite to the sewn part 146 (as to the first embodiment 8, see the modification shown in FIG. 9).

Further, as to the second embodiment, as in the modifications shown in FIG. 10 and FIG. 11 regarding the first embodiment, the length dimension between a pair of protective cloth sewn parts on the protective cloth side may be set to be smaller than the length dimension between a pair of protective cloth sewn parts on the third base cloth side such that the protective cloth sewn parts are formed so as to be broken in the course of inflation of the airbag by gas introduction from the inflator.

MODIFICATIONS

It suffices that the protective cloth is provided to part of the portion into which gas is introduced from the inflator whether in the case of the first embodiment or the second embodiment. For example, the protective cloth 50 may be provided in the portion extending beyond the sewn part 36a in the first embodiment. In addition, the protective cloth 150 may be provided only in the portion of the inner tube 140, which is closer to the inflator 22, in the second embodiment. Further, the sewn parts to which the protective cloth is provided are not required to be formed on edges of the base cloth. For example, in a case where a base cloth or a pair of base cloths are sewn at the spot other than the edges for obtaining a predetermined inflation and deployment form (for example, flat shape), the protective cloth may be provided to the sewn parts with a similar configuration to the above. That is, in a case where the opposed portions of the base cloths are sewn, it suffices that the protective cloth is sewn to each of the pair of opposed portions of the base cloths at the positions apart from the sewn part along the sewn part so as to cover the sewn part.

Further, the protective cloth is also applicable to ones other than the curtain airbag described above. That is, an airbag can employ the configuration in which the protective cloth is provided so as to cover the sewn part as long as the airbag is formed by sewing one or a plurality of base cloths, has the interior space into which gas is introduced from an inflator, and has a sewn part obtained by sewing a pair of edges of the base cloths in the portion into which gas is introduced from the inflator 22.

While the airbag device has been described in detail, the foregoing description is in all aspects illustrative, and the present invention is not limited thereto. That is, numerous modifications and variations can be devised in the described aspects without departing from the scope of the invention.

The invention claimed is:

1. An airbag device, comprising:
    an inflator supplying gas in the event of a vehicle emergency; and
    an airbag inflated and deployed by the gas introduction from said inflator,
    wherein said airbag includes a sewn part obtained by sewing a pair of opposed portions of at least one base cloth in a portion into which the gas from said inflator is introduced, and further includes a protective cloth sewn to each of said pair of opposed portions at a pair of protective cloth sewn parts provided at positions apart from said sewn part along said sewn part such that the protective cloth covers at least a portion of said sewn part from an inner side of the airbag into which the gas from said inflator is introduced, and said pair of said protective cloth sewn parts is sewn to said pair of opposed portions at positions that are horizontally opposed with respect to said sewn part and apart from each other.

2. The airbag device according to claim 1, wherein:
    said airbag includes an airbag body inflated and deployed into a bag shape upon a first base cloth and a second base cloth being sewn, and the gas from said inflator is introduced directly into said airbag body; and
    said protective cloth is provided to at least part of the sewn part of said first base cloth and said second base cloth.

3. The airbag device according to claim 1, wherein a length dimension of said protective cloth between said pair of protective cloth sewn parts on a side of the protective cloth opposed to the sewn part is larger than a length dimension of said protective cloth between said pair of protective cloth sewn parts on a side of the protective cloth adjacent to the sewn part.

4. The airbag device according to claim 1, wherein a length dimension of said protective cloth between said pair of protective cloth sewn parts on a side of the protective cloth opposed to the sewn part is smaller than a length dimension of said protective cloth between said pair of protective cloth sewn parts on a side of the protective cloth adjacent to the sewn part, and
    wherein at least one of said pair of protective cloth sewn parts is formed so as to be broken by a tension acting by the gas introduction.

5. The airbag device according to claim 1, wherein said protective cloth is sewn to said pair of opposed portions such that edges thereof are directed to said sewn part and that an intermediate part in a width direction thereof is directed to an interior space side into which the gas from said inflator is introduced.

6. The airbag device according to claim 1, wherein said protective cloth is sewn in a state in which edges of said at least one base cloth and edges of said protective cloth are aligned with each other.

7. An airbag device comprising:
    an inflator supplying gas in the event of a vehicle emergency; and
    an airbag inflated and deployed by the gas introduction from said inflator,
    wherein said airbag includes:

an airbag body inflated and deployed into a bag shape; and an inner tube located in said airbag body and distributing the gas from said inflator into a plurality of spots in said airbag body;

said inner tube is formed by rolling a belt-like third base cloth into a tubular shape and sewing both edges thereof with inner side surfaces thereof being opposed to each other; and said inner tube includes a sewn part obtained by sewing said both edges in a portion into which the gas from said inflator is introduced;

said airbag further includes a protective cloth disposed adjacent to at least part of said sewn part on both edges of said inner tube and sewn to each edge at a pair of protective cloth sewn parts provided in positions apart from said sewn part along said sewn part such that the protective cloth covers at least a portion of the sewn part from an inner side of the inner tube into which the gas from said inflator is introduced, and said pair of said protective cloth sewn parts is sewn to said edges of the inner tube at positions that are horizontally opposed with respect to said sewn part and apart from each other.

8. The airbag device according to claim 7, wherein an opening formed by said protective cloth or an opening formed by said protective cloth and said third base cloth on said inflator side is closed.

9. The airbag device according to claim 7, wherein a length dimension of said protective cloth between said pair of protective cloth sewn parts on a side of the protective cloth opposed to the sewn part is larger than a length dimension of said protective cloth between said pair of protective cloth sewn parts on a side of the protective cloth adjacent to the sewn part.

10. The airbag device according to claim 7, wherein a length dimension of said protective cloth between said pair of protective cloth sewn parts on a side of the protective cloth opposed to the sewn part is smaller than a length dimension of said protective cloth between said pair of protective cloth sewn parts on a side of the protective cloth adjacent to the sewn part, and wherein at least one of said pair of protective cloth sewn parts is formed so as to be broken by a tension acting by the gas introduction.

11. The airbag device according to claim 7, wherein said protective cloth is sewn to said edges of the inner tube such that edges of the protective cloth are directed to said sewn part and such that an intermediate part in a width direction thereof is directed to an interior space side into which the gas from said inflator is introduced.

12. The airbag device according to claim 7, wherein said protective cloth is sewn in a state in which the edges of the inner tube and edges of said protective cloth are aligned with each other.

* * * * *